(12) United States Patent
Tousain et al.

(10) Patent No.: US 10,123,390 B2
(45) Date of Patent: Nov. 6, 2018

(54) ENERGY MANAGEMENT CONTROL FOR SOLAR-POWERED LIGHTING DEVICES

(75) Inventors: Robertus Leonardus Tousain, Eindhoven (NL); Jan-Ivo Blankestijn, Best (NL); Bertrand Johan Edward Hontele, Breda (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 1780 days.

(21) Appl. No.: 13/574,805

(22) PCT Filed: Jan. 31, 2011

(86) PCT No.: PCT/IB2011/050408
§ 371 (c)(1),
(2), (4) Date: Jul. 24, 2012

(87) PCT Pub. No.: WO2011/095922
PCT Pub. Date: Aug. 11, 2011

(65) Prior Publication Data
US 2012/0293077 A1  Nov. 22, 2012

(51) Int. Cl.
*H05B 37/00* (2006.01)
*H02J 7/00* (2006.01)
(Continued)

(52) U.S. Cl.
CPC .............. *H05B 37/00* (2013.01); *H02J 7/00* (2013.01); *H05B 37/0227* (2013.01);
(Continued)

(58) Field of Classification Search
CPC ... H05B 37/00; H02J 7/00; H02J 3/383; H02J 7/35; Y02E 10/563; Y10S 323/906
(Continued)

(56) References Cited

U.S. PATENT DOCUMENTS

| 4,636,931 A * | 1/1987 | Takahashi | H02J 7/35 136/293 |
| 6,346,670 B1 * | 2/2002 | Fujii | H02J 7/35 136/244 |

(Continued)

FOREIGN PATENT DOCUMENTS

| JP | 4200245 A1 | 7/1992 |
| JP | 2008086109 A | 4/2008 |
| JP | 2008148442 A | 6/2008 |

OTHER PUBLICATIONS http://web.mit-edu/evt/summary_battery_specifications.pdf, "A Guide to Understanding Battery Specifications," MIT Electric Vehicle Team, Dec. 2008 (3 Pages).

*Primary Examiner* — Tung X Le
*Assistant Examiner* — Henry Luong

(57) ABSTRACT

This invention relates to a method of controlling the light output of a solar-powered lighting device. The lighting device comprises a light source, a battery connected to the light source, a solar-power generator including a charger connected to the battery, and a control unit for performing the light output control. The method comprises: —charging the battery while solar-power is generated; —acquiring local day-light data; —repeatedly: —acquiring, at predetermined time intervals, local weather forecast data covering a predetermined time period, and determining a lighting output profile for the predetermined time period; and —driving the lighting device according to the lighting output profile, wherein said determining a lighting output profile comprises: —predicting a lighting demand for the predetermined time period on basis of first environment light data, which first environment light data comprises the local day-light data; —predicting a battery capacity for the predetermined time period on basis of a present energy storage level and second environment light data, which second environment (Continued)

light data comprises the weather forecast data and the local day-light data; and —determining the lighting output profile on basis of the lighting demand and the battery capacity under consideration of keeping the energy storage level above a predetermined minimum level during the predetermined time period.

13 Claims, 2 Drawing Sheets

(51) Int. Cl.
  *H05B 37/02* (2006.01)
  *H02J 3/38* (2006.01)
(52) U.S. Cl.
  CPC .......... *H05B 37/0281* (2013.01); *H02J 3/383* (2013.01); *Y02A 30/12* (2018.01); *Y02B 20/42* (2013.01); *Y02E 10/563* (2013.01)

(58) Field of Classification Search
  USPC .......................... 315/149–159, 297, 291, 308
  See application file for complete search history.

(56) References Cited

U.S. PATENT DOCUMENTS

| | | |
|---|---|---|
| 2002/0053879 A1 | 5/2002 | Thoma et al. |
| 2008/0266846 A1 | 10/2008 | Cheng et al. |
| 2009/0129067 A1 | 5/2009 | Fan et al. |
| 2009/0302681 A1 | 12/2009 | Yamada et al. |
| 2009/0316392 A1 | 12/2009 | Chou |
| 2010/0201267 A1* | 8/2010 | Bourquin ........... H05B 37/0245 315/32 |
| 2012/0153888 A1* | 6/2012 | Jung ................... H01M 10/465 320/101 |

* cited by examiner

ENERGY MANAGEMENT CONTROL FOR SOLAR-POWERED LIGHTING DEVICES

FIELD OF THE INVENTION

The present invention relates to solar-powered lighting devices and to the operation thereof.

BACKGROUND OF THE INVENTION

Solar-powered lighting devices are dependent on energy stored in a battery during periods of available solar-power. Typically, the battery is charged in the daytime and the lighting device is on during the night, powered by the battery. It is desirable that the stored energy in the battery will last from one time period of charging to the next. When the weather is poor for a long period the solar-energy may not be enough for charging the battery to a high enough level.

This problem has been addressed in prior art, such as in JP2008086109, which relates to a general system where a natural power plant charges a battery which drives a load. Weather forecast data is used to predict the future power generation by the power plant, and, on basis thereof, the future discharging of stored power is predicted. The load can be driven in at least two different power modes, including a normal power mode and a power saving mode, i.e. a low power mode. If it is anticipated that the discharging will empty the battery below a predetermined bottom level before the power plant will generate charging power again, then the power saving mode is set.

This way of operating the load is inaccurate and in the specific case according to this invention where the load is a lighting device, the general teachings of JP 2008086109 do not provide any detailed guidance.

SUMMARY OF THE INVENTION

It is an object of the present invention to provide a solution that alleviates the above-mentioned drawbacks of the prior art and provides a more accurate and customized operation of the lighting device.

This object is achieved by a method of controlling the light output of a solar-powered lighting device, and a solar-powered lighting device according to the present invention as defined in the appended claims.

The invention is based on an insight that by considering also the lighting demand, i.e. how the lighting device is desired to operate, due to weather conditions etc., a more accurate control of the powering of the lighting device is obtained.

Thus, in accordance with an aspect of the present invention, there is provided a method of controlling the light output of a solar-powered lighting device comprising a light source, a battery connected to the light source, a solar-power generator including a charger connected to the battery, and a control unit for performing the light output control. The method comprises:
  charging the battery while solar-power is generated;
  acquiring local day-light data;
  repeatedly:
  acquiring, at predetermined time intervals, local weather forecast data covering a predetermined time period, and determining a lighting output profile for the predetermined time period; and
  driving the lighting device according to the lighting output profile, wherein said determining a lighting output profile comprises:
  predicting a lighting demand for the predetermined time period on basis of first environment light data, which first environment light data comprises the local day-light data;
  predicting a battery capacity for the predetermined time period on basis of a present energy storage level and second environment light data, which second environment light data comprises the weather forecast data and the local day-light data; and
  determining the lighting output profile on basis of the lighting demand and the battery capacity under consideration of keeping the energy storage level above a predetermined minimum level during the predetermined time period.

Thus, by taking into account environment light data, which includes at least local day-light data, the demand of light from the lighting device can be predicted. The demand prediction is combined with a prediction of available power from the battery in order to determine a lighting output profile for the predetermined time period. The lighting output profile provides for a considerably more accurate control than the simple discrete level control of the prior art, which, additionally, does not at all consider the actual power demand of the load.

In accordance with an embodiment of the method, the first environment data comprises the weather forecast data. In this embodiment, in addition to the day-light also weather conditions are considered when predicting the lighting demand. For instance, bad weather in the day may cause a demand of lighting.

In accordance with an embodiment of the method the predetermined time period is several times as long as said predetermined time interval. Thereby the lighting output profile is updated well before the end of the predetermined time period, which increases the accuracy of the lighting control.

In accordance with an embodiment of the method, the determination of a lighting output profile comprises determining a constant light output during a predicted demand of lighting. Thereby the lighting conditions are perceived as stable and reliable by people using the lighting.

In accordance with an embodiment of the method, the light source comprises at least one outdoor light source chosen from a group of outdoor light sources comprising street lighting, highway lighting, highway signal lighting and general outdoor lighting.

In accordance with an aspect of the invention there is provided a solar-powered lighting device comprising a light source, a battery connected to the light source, a solar-power generator including a charger connected to the battery, and a control unit for performing the light output control. The solar-power generator is arranged to charge the battery while solar-power is generated. The control unit is arranged to:
  acquire local day-light data; and
  repeatedly:
  acquire, at predetermined time intervals, local weather forecast data covering a predetermined time period, and determine a lighting output profile for the predetermined time period; and
  drive the lighting device according to the lighting output profile. In order to determine the lighting output profile, the control unit is arranged to:
  predict a lighting demand for the predetermined time period on basis of first environment light data, which first environment light data comprises the local day-light data;

predict a battery capacity for the predetermined time period on basis of a present energy storage level and second environment light data, which second environment light data comprises the weather forecast data and the local day-light data; and determine the lighting output profile on basis of the lighting demand and the battery capacity under consideration of keeping the energy storage level above a predetermined minimum level during the predetermined time period.

The solar-powered lighting device has corresponding advantages as indicated above for the method. The same is true for embodiments of the solar-power lighting device corresponding to the above-mentioned embodiments of the method.

According to another aspect of the invention, there is provided a computer program product comprising a computer readable storage having stored therein computer program portions for performing a method of controlling light output of a solar-powered lighting device, comprising:

acquiring local day-light data;
repeatedly:
acquiring, at predetermined time intervals, local weather forecast data covering a predetermined time period, and determining a lighting output profile for the predetermined time period; and driving a lighting device according to the lighting output profile, wherein said determining a lighting output profile comprises:

predicting a lighting demand for the predetermined time period on basis of first environment light data, which first environment light data comprises the local day-light data;

acquiring data about a present storage level of a battery;

predicting a battery capacity for the predetermined time period on basis of the present energy storage level and second environment light data, which second environment light data comprises the weather forecast data and the local day-light data; and determining the lighting output profile on basis of the lighting demand and the battery capacity under consideration of keeping the energy storage level above a predetermined minimum level during the predetermined time period.

These and other aspects, features, and advantages of the invention will be apparent from and elucidated with reference to the embodiments described hereinafter.

BRIEF DESCRIPTION OF THE DRAWINGS

The invention will now be described in more detail and with reference to the appended drawings in which.

DESCRIPTION OF PREFERRED EMBODIMENTS

Figure 1:
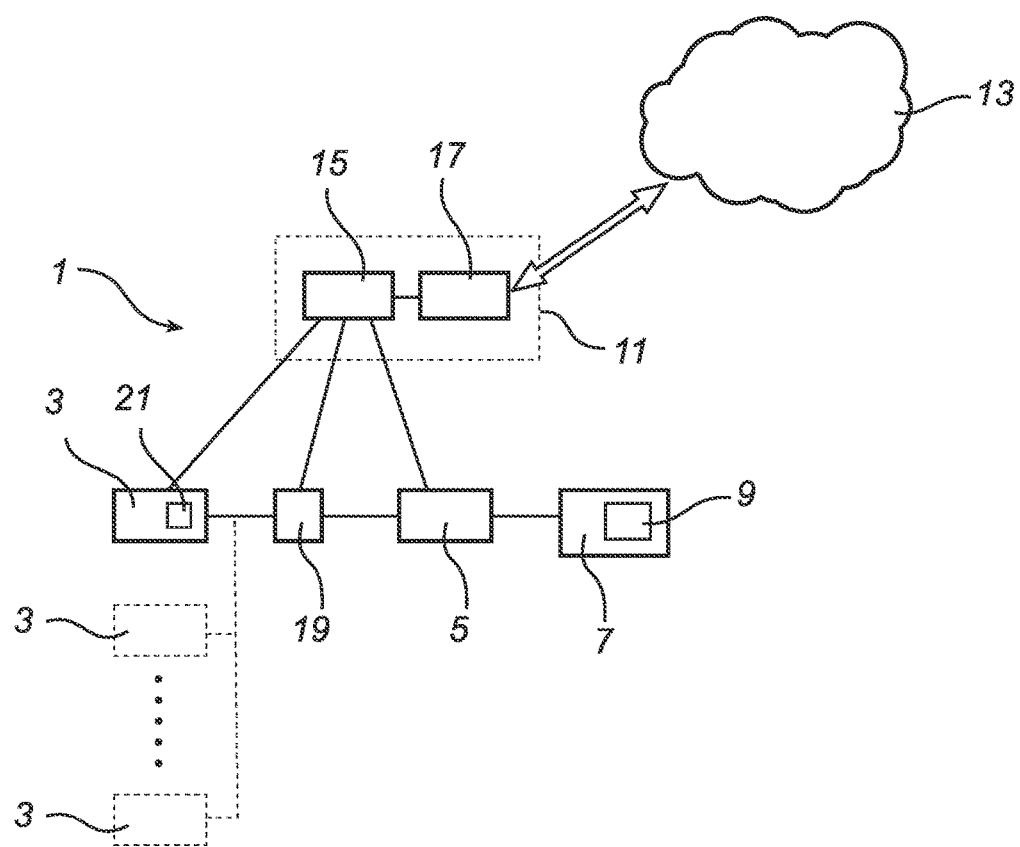
FIG. 1 is a schematic block diagram of an embodiment of a lighting device according to the present invention.

One embodiment of a solar-power lighting device 1 comprises a light source 3, a battery 5, which is connected to the light source 3, a solar-power generator 7, which includes a charger 9, and which is connected to the battery 5, and a control unit 11, which is arranged to perform the light output control. The control unit 11 can be implemented in any suitable way, such as a micro computer or the like, as understood by a person skilled in the art. Principally, the control unit 11 comprises a processing unit 15, such as a micro processor, and a communication interface 17, which is connected to Internet 13 and to the processing unit 15. Preferably, the Internet connection is wireless, although a wired connection can be appropriate as well.

More particularly, the battery 5 is connected to the light source 3 via a power controller 19, controlled by the control unit 11. The control unit 11 is connected with the battery 5 for acquiring data about the present storage level, i.e. data about how much energy is left in the battery 5. Further, the control unit 11 is connected with the light source, which houses a sensor device 21, which comprises at least a sensor for sensing a present environment light level.

Typically, the lighting device 1 comprises several light sources 3, as indicated in FIG. 1 with dashed boxes, such as in street light applications and in highway signal lighting applications.

Figure 2:
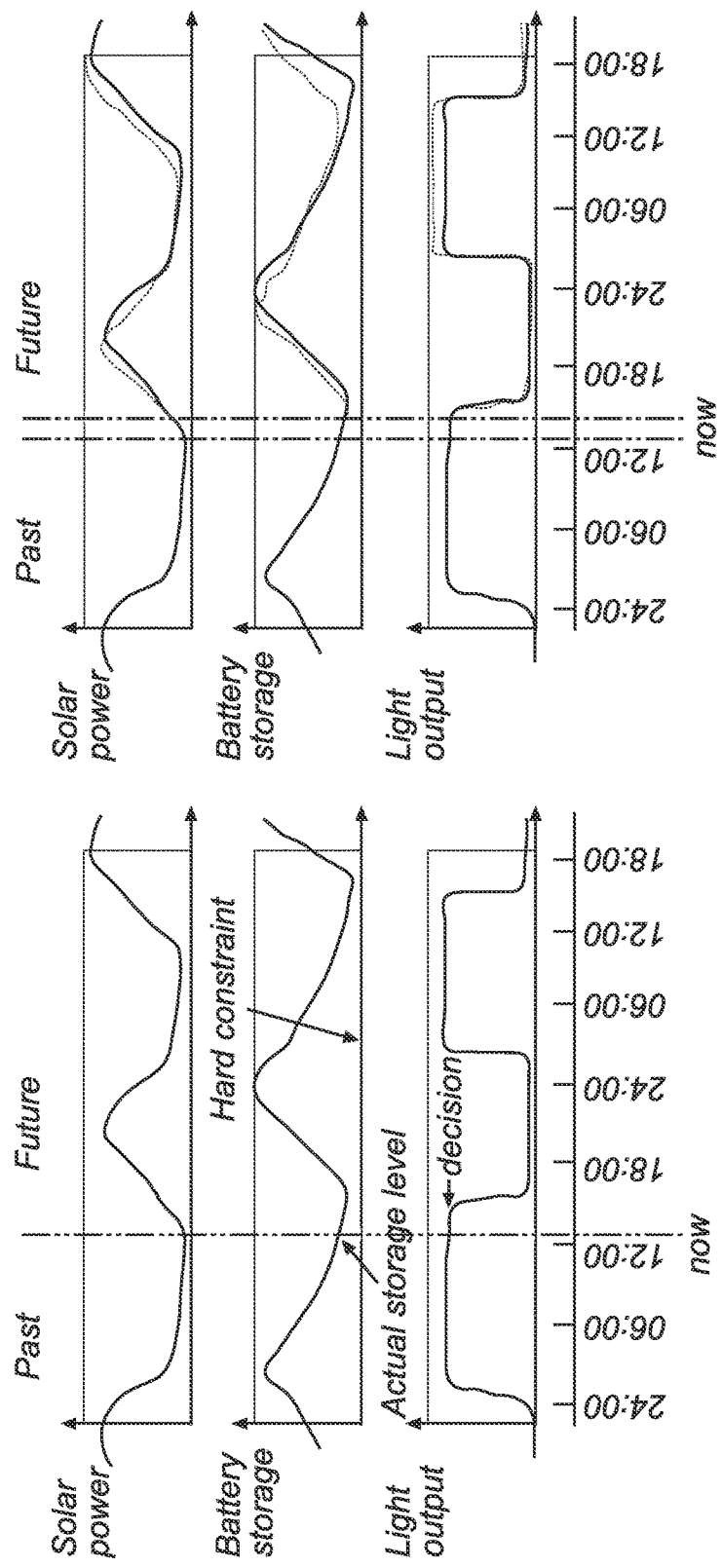
FIG. 2 shows timing diagrams illustrating an embodiment of a method of controlling the light output of a solar-powered lighting device according to the present invention.

The lighting device 1 is operated as follows. Whenever the environmental light is bright enough for the solar-power generator 7 to generate power it charges the battery 5. Of course the charging is done with ordinary overcharge protection. The control unit 11 acquires local day-light data from Internet 13 in order to know when the sun can be expected to shine. Furthermore, the control unit 11 acquires local weather forecast data in order to be able to predict if the day-light can be expected to be enough to activate the solar-power generator 7 or not. The control unit 11 is arranged to make predictions regarding on one hand a lighting demand, i.e. whether there is a demand of artificial light from the light source 3 or not, and on the other hand a battery capacity. The predictions are made for a predetermined time period, which is adjustable. Typically, though not necessarily, the time period is approximately 48 hours. Based on the predictions of battery capacity and lighting demand, the control unit 11 determines a lighting output profile for the predetermined time period, as illustrated in FIG. 2. More particularly, in a basic embodiment, the lighting demand for the predetermined time period is predicted on basis of first environment light data, which at least includes the local day-light data, and the battery capacity for the predetermined time period is predicted on basis of a present energy storage level, as obtained by the control unit 11 from the battery 5, and a second environment light data, which at least includes the weather forecast data and the local day-light data. Thus, in order to predict the battery capacity, the weather is of great importance, in order to know to what extent the battery can be expected to be charged by the solar-power generator 7.

The lighting output profile is determined under consideration of how much energy there will be left in the battery at the most critical point of time, typically at the end of night when the light source has been lit and has just been switched off. The control unit 11 is arranged to always keep the energy storage level of the battery 5 above a predetermined minimum level.

When the lighting output profile has been determined, the control unit 11 starts controlling the light source 3 accordingly. When the light source 3 is to be switched on the control unit 11 operates the power controller 19 such that the power level is properly set in accordance with the lighting output profile. This may result in a full intensity level or a reduced intensity level of the light source 3. However, since the weather often does not fully correspond with the previously announced weather forecast, the lighting output profile is updated repeatedly and well before the end of the predetermined time period. Common updating intervals are one or more times per hour. The updating means that the control unit 11 again acquires local weather forecast data, which is trusted to have been updated since the last time, but it may be difficult to find a weather service providing such frequent updates of the forecast. In order to acquire an appropriate weather forecast for the location, the solar-powered lighting device 1 is user programmable with geographical data input or is provided with a positioning unit, such as a GPS (Global Positioning System) receiver.

Thus, the operation of the solar-powered lighting device is performed as a predictive control energy management, where roughly a prediction of the future available solar power is made using the first and second environment data. Based on this prediction and based on the present battery storage level a forecast is made of the light output profile over the coming predetermined time period, such that the best possible light output can be generated during night time without hitting the bottom of the energy storage. From this forecast only a first portion is actually implemented before the forecast is updated using the most up-to-date weather forecast and the actual battery storage level. The updated forecast then typically covers a new time period of the same length as the first forecast, thus extending a bit further ahead. This is illustrated in FIG. 2. In the left part of FIG. 2 the situation at the time "now" is shown, with on the right side of the vertical line labeled "now" the predicted available solar power, the predicted battery storage capacity and the predicted lighting output profile for a predetermined time period in the future. The control unit 11 operates the power controller 19 to drive the light source 3 according to the "decision" as illustrated in figure. The "decision" for example may set a constant light output for the period until a next update of the predicted light output profile is available, although other "decision" may be made based on all available data. On the right part of FIG. 2 the situation at the next update is shown, when the "now" moment has shifted forward. The dotted lines show the updated prediction whereas the solid lines show the previous prediction corresponding. It is clearly shown in FIG. 2 that the predetermined time period is may be considerably larger than, preferably several times as long as, the predetermined time interval used to successively update the predictions.

According to another embodiment said first environment data further comprises the weather forecast data, in order to be able to fine adjust the lighting output profile. For instance if it is forecasted that there will be poor weather conditions a higher light output will be desired, or it may even be desired to switch on the light source during daytime due to some particularly poor weather conditions.

All in all the local weather forecast data combined with the local day-light data, or time of the year data, which may include moonlight data, is usable for predicting a reduced light output during a night with a clear sky and bright moonlight, and for predicting a reduced light output when worsening weather conditions are anticipated in order to make the energy last until power generation is expected to increase again.

It is preferred to determine a substantially constant light output within each respective period where the light source 3 is switched on.

In order to further improve the quality of the predictions, the environment light is measured by means of the sensor, at the sensor device 21, for sensing a present environment light level. In further embodiments the sensor device 21 comprises further sensors for sensing climatological data and weather data, such as a temperature sensor and a precipitation sensor and which are used for improving the optimization of the predictions, and thus the determination of the lighting profile.

In a further embodiment, the control unit 11 is additionally arranged to perform a learning process where repetitive behavior in the weather conditions is detected and employed in the decision making in order to further optimize the use of the light source 3. The repetitive behavior can be short term as well as long term behavior, such as time period-to-time period, day-to-day, and year-to-year.

It is possible to implement the method as computer program instructions, which are providable by means of a computer program product comprising computer readable storage wherein the computer program instructions are stored.

In further embodiments of the method and the device 1, the lighting device 1 receives remote requests over Internet 13, and sends corresponding responses to a remote controller. Thereby the performance of the lighting device 1 is remotely monitored over Internet 13. Examples of parameters that can be monitored are battery life and solar panel efficiency.

According to another embodiment, preventive maintenance is remotely scheduled over the Internet 13.

By means of the lighting device and the method according to this invention it is possible to increase the energy efficiency in comparison with the prior art. In other words it is possible to use a battery of smaller capacity, and thus of smaller size, for a particular application.

Above, embodiments of the method of controlling the light output of a solar-powered light source and of the solar-powered lighting device according to the present invention as defined in the appended claims have been described. These should be seen as merely non-limiting examples. As understood by a skilled person, many modifications and alternative embodiments are possible within the scope of the invention.

It is to be noted, that for the purposes of this application, and in particular with regard to the appended claims, the word "comprising" does not exclude other elements or steps, that the word "a" or "an", does not exclude a plurality, which per se will be apparent to a person skilled in the art.

The invention claimed is:

1. A method of controlling light output of a solar-powered lighting device comprising a light source, a battery connected to the light source, a solar-power generator including a charger connected to the battery, and a control unit for performing the light output control, comprising:
   charging the battery while solar-power is generated;
   acquiring local day-light data;
   repeatedly:
      acquiring, at predetermined time intervals, local weather forecast data covering a predetermined time period, and determining a lighting output profile for the predetermined time period; and
      driving the lighting device according to the lighting output profile, wherein said determining a lighting output profile comprises:
   predicting a lighting demand for the predetermined time period on basis of first environment light data, which first environment light data comprises the local day-light data;
   predicting a battery storage level for the predetermined time period on basis of a present energy storage level and second environment light data, which second environment light data comprises the weather forecast data and the local day-light data; and
   determining the lighting output profile on basis of the lighting demand and the battery storage level under consideration of keeping the energy storage level above a predetermined minimum level during the predetermined time period.

2. A method according to claim 1, wherein said first environment data comprises the weather forecast data.

3. A method according to claim 1, wherein said predetermined time period is several times as long as said predetermined time interval.

4. A method according to claim 1, wherein said determining a lighting output profile comprises determining a constant light output during a predicted demand of lighting.

5. A method according to claim 1, wherein the light source comprises at least one outdoor light source chosen from a group of outdoor light sources comprising street lighting, highway lighting, highway signal lighting and general outdoor lighting.

6. A method according to claim 1, wherein said local day-light data and said local weather forecast data is acquired over the Internet.

7. A method according to claim 1, further comprising at least one of remotely monitoring, over Internet, the performance of the solar-powered lighting device, and scheduling preventive maintenance.

8. A solar-powered lighting device comprising a light source, a battery connected to the light source, a solar-power generator including a charger connected to the battery, and a control unit for performing light output control, wherein the solar-power generator is configured to charge the battery while solar-power is generated, and wherein the control unit is configured to:
acquire local day-light data; and
repeatedly:
    acquire, at predetermined time intervals, local weather forecast data covering a predetermined time period, and determine a lighting output profile for the predetermined time period; and
    drive the lighting device according to the lighting output profile, wherein the control unit is configured to, in order to determine the lighting output profile:
predict a lighting demand for the predetermined time period on basis of first environment light data, which first environment light data comprises the local day-light data;
predict a battery storage level for the predetermined time period on basis of a present energy storage level and second environment light data, which second environment light data comprises the weather forecast data and the local day-light data; and
determine the lighting output profile on basis of the lighting demand and the battery storage level under consideration of keeping the energy storage level above a predetermined minimum level during the predetermined time period.

9. A solar-powered lighting device according to claim 8, wherein said first environment data comprises the weather forecast data.

10. A solar-powered lighting device according to claim 8, wherein said predetermined time period is several times as long as said predetermined time interval.

11. A solar-powered lighting device according to claim 8, wherein the light source comprises at least one outdoor light source chosen from a group of light sources comprising street lighting, highway lighting, highway signal lighting and general outdoor lighting.

12. A solar-powered lighting device according to claim 8, wherein the light source comprises a sensor device, including an environment light level sensor.

13. A computer program product comprising a non-transitory computer readable storage medium having stored therein computer program portions for performing a method of controlling light output of a solar-powered lighting device, comprising:
acquiring local day-light data;
repeatedly:
    acquiring, at predetermined time intervals, local weather forecast data covering a predetermined time period, and determining a lighting output profile for the predetermined time period; and
    driving a lighting device according to the lighting output profile, wherein said determining a lighting output profile comprises:
predicting a lighting demand for the predetermined time period on basis of first environment light data, which first environment light data comprises the local day-light data;
acquiring data about a present storage level of a battery;
predicting a battery storage level for the predetermined time period on basis of the present energy storage level and second environment light data, which second environment light data comprises the weather forecast data and the local day-light data; and
determining the lighting output profile on basis of the lighting demand and the battery storage level under consideration of keeping the energy storage level above a predetermined minimum level during the predetermined time period.

* * * * *